(12) United States Patent
Isoyama et al.

(10) Patent No.: US 11,899,793 B2
(45) Date of Patent: Feb. 13, 2024

(54) INFORMATION PROCESSING APPARATUS, CONTROL METHOD, AND PROGRAM

(71) Applicant: NEC CORPORATION, Tokyo (JP)

(72) Inventors: Kazuhiko Isoyama, Tokyo (JP); Yoshiaki Sakae, Tokyo (JP); Jun Nishioka, Tokyo (JP); Etsuko Ichihara, Tokyo (JP); Kosuke Yoshida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 747 days.

(21) Appl. No.: 16/976,311

(22) PCT Filed: Mar. 1, 2018

(86) PCT No.: PCT/JP2018/007763
§ 371 (c)(1),
(2) Date: Aug. 27, 2020

(87) PCT Pub. No.: WO2019/167225
PCT Pub. Date: Sep. 6, 2019

(65) Prior Publication Data
US 2021/0042412 A1 Feb. 11, 2021

(51) Int. Cl.
*G06F 21/56* (2013.01)

(52) U.S. Cl.
CPC ...... *G06F 21/566* (2013.01); *G06F 2221/034* (2013.01)

(58) Field of Classification Search
CPC ............ G06F 21/566; G06F 2221/034; G06F 11/302; G06F 11/3006; G06F 2201/86; G06F 21/554; G06N 20/20
See application file for complete search history.

(56) References Cited

U.S. PATENT DOCUMENTS 10,685,112 B2* 6/2020 Zhao ................... H04L 63/145
10,721,247 B2* 7/2020 Komashinskiy .... H04L 63/1416
(Continued)

FOREIGN PATENT DOCUMENTS

EP 3244335 A1 11/2017
JP 2006-268775 A 10/2006
(Continued)

OTHER PUBLICATIONS

Japanese Office Action for JP Application No. 2020-503209 dated Apr. 27, 2021 with English Translation.
(Continued)

*Primary Examiner* — Christopher A Revak
(74) *Attorney, Agent, or Firm* — Sughrue Mion, PLLC

(57) ABSTRACT

An information processing apparatus (2000) classifies each event that occurred in a target apparatus to be determined (10) either as an event (event of a first class) that also occurs in a standard apparatus (20) or as an event (event of a second class) that does not occur in the standard apparatus (20). Herein, a first model used for a determination with respect to an event that also occurs in the standard apparatus (20) and a second model used for a determination with respect to an event that does not occur in the standard apparatus (20) are used as models for determining whether an event that occurs in a target apparatus to be determined (10) is a target for warning. The information processing apparatus (2000) performs learning of the first model using an event of the first class. Further, the information processing apparatus (2000) performs learning of the second model using an event of the second class.

17 Claims, 7 Drawing Sheets

(56) References Cited

U.S. PATENT DOCUMENTS

| | | | | |
|---|---|---|---|---|
| 11,138,514 B2 * | 10/2021 | Hu | ......................... | G06N 20/00 |
| 2017/0269985 A1 * | 9/2017 | Xiao | ................. | G06F 16/24578 |

FOREIGN PATENT DOCUMENTS

| | | | |
|---|---|---|---|
| JP | 2008-129714 A | 6/2008 | |
| JP | 2015-108898 A | 6/2015 | |
| WO | 2014/020908 A1 | 2/2014 | |
| WO | 2016/132992 A1 | 8/2016 | |
| WO | WO 2021/137706 A1 * | 7/2021 | ............. G06F 21/55 |

OTHER PUBLICATIONS

International Search Report for PCT/JP2018/007763 dated May 29, 2018.

* cited by examiner

FIG. 5

| SUBJECT INFORMATION | | OBJECT INFORMATION | | CONTENTS INFORMATION |
|---|---|---|---|---|
| PROCESS NAMES | PATHS | TYPES | IDENTIFICATION INFORMATION | |
| process A | C¥:dir11/dir12/a1.exe | PROCESS | D¥:dir21/dir22/a2.exe | START |
| process B | C¥:dir13/dir14/b1.exe | FILE | D¥:dir23/b2.conf | WRITE |
| process C | C¥:dir15/dir16/c1.exe | APPARATUS | 192.168.24.11 | READ |
| ... | ... | ... | ... | ... |

INFORMATION PROCESSING APPARATUS, CONTROL METHOD, AND PROGRAM

CROSS-REFERENCE TO RELATED APPLICATIONS

This application is a National Stage of International Application No. PCT/JP2018/007763 filed Mar. 1, 2018.

TECHNICAL FIELD

The present invention relates to anomaly detection.

BACKGROUND ART

A System for monitoring whether a computer system is operating normally has been developed. For example, PTL 1 discloses a system that performs learning of a normal operation model at a time of the normal operation of a target software to be observed, compares the operation of the target software to be observed with the model, and thereby detects an occurrence of anomaly caused by intrusion to the target software to be monitored.

CITATION LIST

Patent Literature

[PTL 1] Japanese Patent Application Publication No. 2008-129714.

SUMMARY OF INVENTION

Technical Problem

According to the method of PTL 1, it is necessary to prepare a model of a system to be monitored while the system is operating normally. In other words, the system to be monitored needs to be in a normal state during a stage when the model is prepared.

The present invention has been made in view of the above-described problem. One of objects of the present invention is to provide a technique capable of starting monitoring whether a target system to be monitored is operating normally in a situation in which it is not known whether the system is operating normally.

Solution to Problem

An information processing apparatus of the present invention includes (1) an acquisition unit that acquires first event information, which indicates information on an event caused by a process in a standard apparatus, and second event information, which indicates information on an event caused by a process in a target apparatus to be determined, (2) a classification unit that classifies, by using the first event information, each event being indicated by the second event information, either as an event of a first class, which is an event that occurs also in the standard apparatus, or as an event of a second class, which is an event that does not occur in the standard apparatus, (3) a first learning unit that performs learning of a first model for determining whether an event classified as the first class is a target event for warning, by using the second event information on an event classified as the first class, and (4) a second learning unit that performs learning of a second model for determining whether an event classified as the second class is a target event for warning, by using the second event information on an event classified as the second class.

A control method of the present invention is a control method executed by a computer. The control method includes (1) an acquisition step of acquiring first event information, which indicates information on an event caused by a process in a standard apparatus, and second event information, which indicates information on an event caused by a process in a target apparatus to be determined, (2) a classification step of classifying, by using the first event information, each event being indicated by the second event information, either as an event of a first class, which is an event that occurs also in the standard apparatus, or as an event of a second class, which is an event that does not occur in the standard apparatus, (3) a first learning step of performing learning of a first model for determining whether an event classified as the first class is a target event for warning, by using the second event information on an event classified as the first class, and (4) a second learning step of performing learning of a second model for determining whether an event classified as the second class is a target event for warning, by using the second event information on an event classified as the second class.

A program of the present invention causes a computer to execute each of the steps included in the control method of the present invention.

Advantageous Effects of Invention

According to the present invention, a technique capable of starting monitoring whether a target system to be monitored is operating normally in a situation in which it is not known whether the system is operating normally is provided.

BRIEF DESCRIPTION OF DRAWINGS

The above-described object and other objects, characteristics, and advantages will be made even more apparent by the preferable example embodiments described below and the attached drawings below.

FIG. 5 is a diagram illustrating information defining an event in tabular form.

EXAMPLE EMBODIMENTS

Example embodiments of the present invention will be described below with reference to the drawings. It should be noted that, throughout the drawings, like constituent elements are denoted by like reference signs and the description thereof will not be repeated where appropriate. Unless otherwise mentioned, the blocks in the block diagrams represent functional components, not hardware components.

Example Embodiment 1

<Outline>

Figure 1:
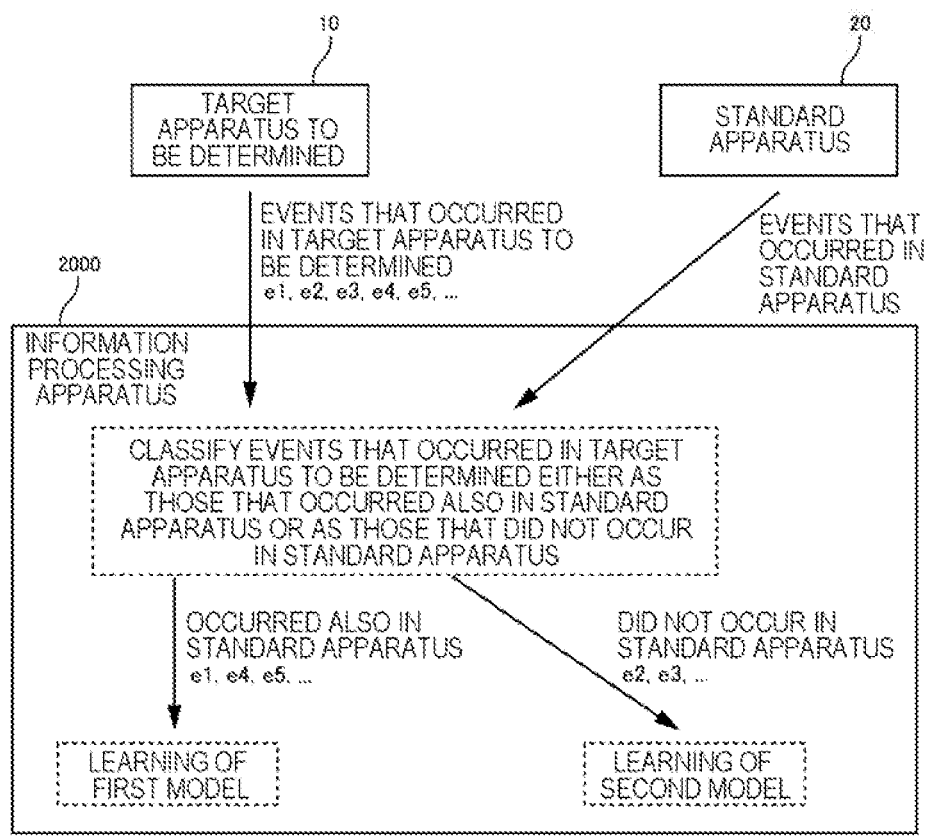
FIG. 1 is a diagram depicting an outline of an operation of an information processing apparatus according to Example Embodiment 1.

FIG. 1 is a diagram depicting an outline of an operation of an information processing apparatus according to Example Embodiment 1. FIG. 1 is a conceptual diagram for facilitating the understanding of an operation of an information processing apparatus 2000 and does not limit the operation of the information processing apparatus 2000 in any concrete way.

With respect to an event caused by a process in a target apparatus to be determined 10, an information processing apparatus 2000 performs learning (updating) of a model with which it is determined whether the event is a target event for warning. Here, a "process" means a program being executed. Further, an "event" is an action that a process performs in relation to any object (another process, file, or the like). An event caused by a process is, for example, a start of another process, a communication with another process, an access to a file, or the like.

The target events for warning may be various events. The target events for warning are, for example, events estimated to be with a high security risk, such as events with a high probability of malware involvement. Other examples of target events for warning will be described later.

Two models, i.e., a first model and a second model will be used as models as described above. The first model is used when the target event to be determined is an event that occurred also in the standard apparatus 20. On the other hand, the second model is used when the target event to be determined is an event that did not occur in the standard apparatus 20. Hereinafter, of the events that occurred in the target apparatus to be determined 10, events that occurred also in the standard apparatus 20 will be referred to as events of the first class and events that did not occur in the standard apparatus 20 will be referred to as events of the second class.

Here, the standard apparatus 20 is a computer considered to have a high probability of operating normally (with a low possibility of a malfunction having occurred). For example, when a warning is to be given about an event having a high probability of malware involvement, a computer having a low probability of malware infection is used as a standard apparatus 20.

To perform learning of the models, the information processing apparatus 2000 acquires information on events that occurred in the standard apparatus 20 (hereinafter referred to as first event information) and information on events that occurred in the target apparatus to be determined 10 (hereinafter referred to as second event information). By using the first event information, the information processing apparatus 2000 classifies each event indicated by the second event information (in other words, the events that occurred in the target apparatus to be determined 10) as an event of the first class or as an event of the second class. The information processing apparatus 2000 performs learning of the first model using the second event information of the events classified as the first class. Further, the information processing apparatus 2000 performs learning of the second model using the second event information of the events classified as the second class.

Advantageous Effects

Since the standard apparatus 20 is a computer having a high probability of operating normally, it can be assumed that the events that occur also in the standard apparatus 20 have a higher probability of being normal events, compared with the events that do not occur in the standard apparatus 20. Therefore, when determining whether an event that occurred in the target apparatus to be determined 10 is a target for warning, it is possible to determine whether the event is a target for warning or not with a high accuracy by taking into account whether the event occurred also in the standard apparatus 20.

Thus, as models for determining whether an event that occurred in the target apparatus to be determined 10 is a target event for warning, the information processing apparatus 2000 has two models, i.e., the first model for performing determination on an event that occurred also in the standard apparatus 20 (an event of the first class) and the second model for performing determination on an event that did not occur in the standard apparatus 20 (an event of the second class). The learning for the first model is performed using events classified as the first class while the learning for the second model is performed using events classified as the second class. In this way, it is possible to determine whether an event that occurred in the target apparatus to be determined 10 is a target for warning or not with a high accuracy as it is possible to make the determination while distinguishing between an event that occurred also in the standard apparatus 20 and an event that did not occur in the standard apparatus 20 when determining whether the event that occurred in the target apparatus to be determined 10 is a target for warning.

Further, the information processing apparatus 2000 according to the present example embodiment uses not the target apparatus to be determined 10 but the standard apparatus 20 as an apparatus operating normally when making the models. Thus, even when the target apparatus to be determined 10 is already in an anomalous state at the start of the learning of the models, models with a high accuracy can be obtained. Therefore, it is possible to start the operation of the information processing apparatus 2000 in a situation in which it is not known whether the apparatus to be monitored (target apparatus to be determined 10) is operating normally.

The information processing apparatus 2000 according to the present example embodiment will be described more in detail below.

<Example of a Functional Configuration of the Information Processing Apparatus 2000>

Figure 2:
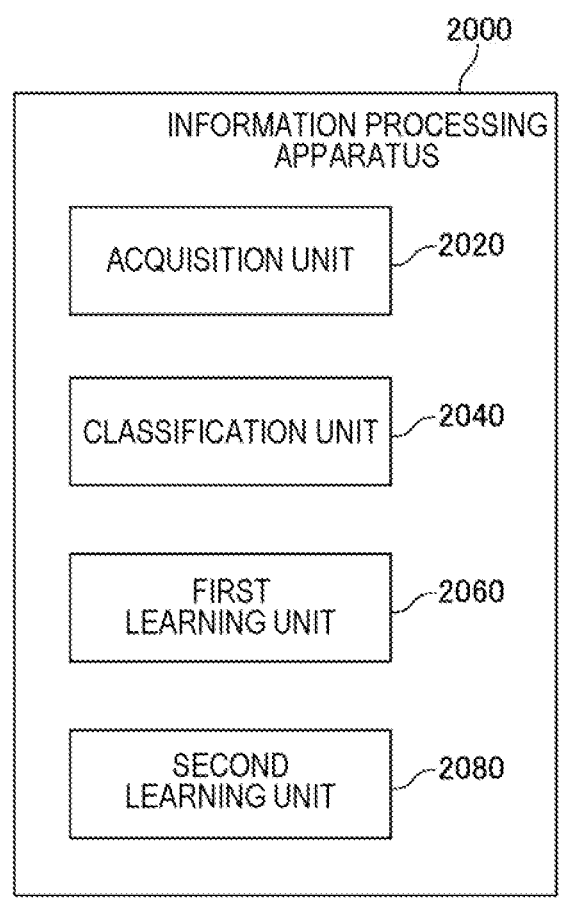
FIG. 2 is a diagram illustrating a configuration of an information processing apparatus according to Example Embodiment 1.

FIG. 2 is a diagram illustrating a configuration of the information processing apparatus according to Example Embodiment 1. The information processing apparatus 2000 includes an acquisition unit 2020, a classification unit 2040, a first learning unit 2060, and a second learning unit 2080. The acquisition unit 2020 acquires first event information and second event information. The first event information is information on an event that a process caused in the standard apparatus 20. The second event information is information on an event that a process caused in the target apparatus to be determined 10.

The classification unit 2040 classifies the events represented by the second event information, as events of the first class and events of the second class by using the first event information. As described above, the events of the first class are events that occurred also in the standard apparatus 20. Further, the events of the second class are events that did not occur in the standard apparatus 20.

The first learning unit 2060 performs learning of the first model, using the second event information on the events classified as the first class. The second learning unit 2080 performs learning of the second model, using the second event information on events classified as the second class.

<Hardware Configuration of the Information Processing Apparatus 2000>

The functional component units of the information processing apparatus 2000 may be realized by hardware (e.g., hardwired electronic circuits or the like) for realizing the functional component units or may be realized by a combination of hardware and software (e.g., a combination of an electronic circuit and a program to control the circuit). A case in which the functional components of the information processing apparatus 2000 are realized by a combination of hardware and software will be further described below.

Figure 3:
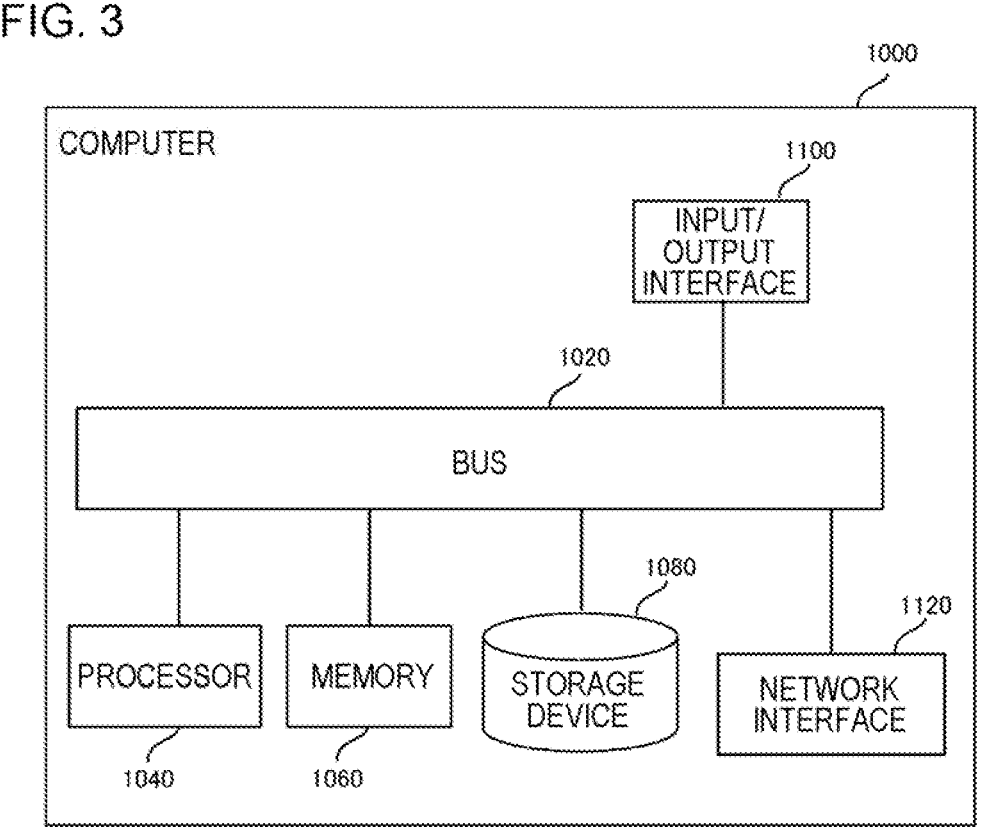
FIG. 3 is a diagram illustrating a computer for realizing an information processing apparatus.

FIG. 3 is a diagram illustrating a computer 1000 for realizing an information processing apparatus 2000. The computer 1000 may be any computer. For example, the computer 1000 may be a personal computer (PC), a server machine, a tablet terminal, a smart phone, or the like. The computer 1000 may be a dedicated computer designed for realizing the information processing apparatus 2000 or may be a general-purpose computer.

The computer 1000 includes a bus 1020, a processor 1040, a memory 1060, a storage device 1080, an input/output interface 1100, and a network interface 1120. The bus 1020 is a data transmission path for mutual data transmission/reception among the processor 1040, the memory 1060, the storage device 1080, the input/output interface 1100, and the network interface 1120. Note, however, that the method of mutual connection among the processor 1040 and the like is not limited to the bus connection. The processor 1040 is a processor such as a central processing unit (CPU), a graphics processing unit (GPU), or a field-programmable gate array (FPGA). The memory 1060 is a main storage device constituted by random access memory (RAM) or the like. The storage device 1080 is an auxiliary storage device realized by a hard disc drive, a solid state drive (SSD), a memory card, read only memory (ROM), or the like. Note, however, that the storage device 1080 may be constituted by a piece of hardware, such as RAM, similar to the piece of hardware constituting the main storage device.

The input/output interface 1100 is an interface for connecting the computer 1000 and the input/output device. The network interface 1120 is an interface for connecting the computer 1000 to a communication network. This communication network is, for example, a local area network (LAN) or a wide area network (WAN). The method of connection between the network interface 1120 and the communication network may be wireless connection or wired connection.

The storage device 1080 stores program modules for realizing the functional component units of the information processing apparatus 2000. The processor 1040 reads these program modules onto the memory 1060 and thereby realizes the functions corresponding to the program modules.

<On the Target Apparatus to be Determined 10>

The target apparatus to be determined 10 may be any computer such a PC, a server machine, a tablet terminal, or a smart phone. There may be one target apparatus to be determined 10 or may be a plurality of apparatuses to be determined 10.

Here, the first model and the second model may be shared by a plurality of apparatuses to be determined 10. In this case, the information processing apparatus 2000 acquires second event information from each of the plurality of apparatuses to be determined 10 that share the first model and the second model.

<On the Standard Apparatus 20>

The standard apparatus 20 may be any computer such a PC, a server machine, a tablet terminal, or a smart phone. As described above, the standard apparatus 20 is a computer having a high probability of operating normally.

The standard apparatus 20 is, for example, a computer to which an operating system (OS) has been clean installed and the operation of which has not yet been started. Note, however, that the standard apparatus 20 need not be a computer the operation of which has not yet been started but may be a computer being operated in a situation with a low probability of an occurrence of malfunction. Such a computer is, for example, a computer operated in a situation with a low probability of malware infection, such as a computer of which the connection to a network is more strictly restricted, compared with the computers for general users, and a computer operated by a security expert.

<Flow of Processing>

Figure 4:
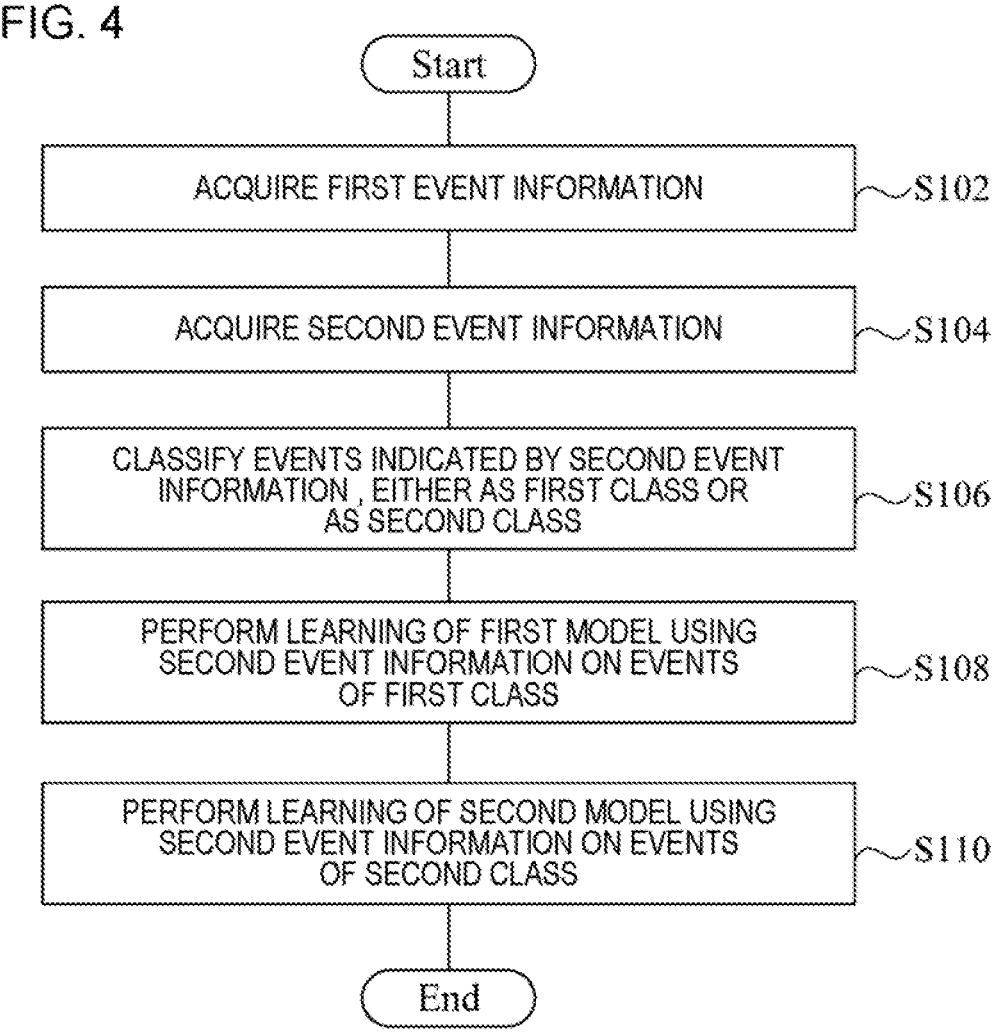
FIG. 4 is a flow chart illustrating a flow of processing executed by an information processing apparatus according to Example Embodiment 1.

FIG. 4 is a flow chart illustrating a flow of processing executed by an information processing apparatus 2000 according to Example Embodiment 1. The acquisition unit 2020 acquires the first event information (S102). The acquisition unit 2020 acquires the second event information (S104). The classification unit 2040 classifies each event indicated by the second event information, either as the first class or as the second class (S106). The first learning unit 2060 performs learning of the first model using the second event information on the events classified as the first class (S108). The second learning unit 2080 performs learning of the second model using the second event information on the events classified as the second class (S110).

Here, it is preferable that the learning of the models using the events that occurred in the target apparatus to be determined 10 are performed repeatedly during the operation of the target apparatus to be determined 10. Thus, for example, the information processing apparatus 2000 acquires second event information repeatedly and, every time the information processing apparatus 2000 acquires second event information, the information processing apparatus 2000 performs learning of the models, using the second event information (from S106 to S110).

<On Events>

As described above, an event is an action that a process performs in relation to any object. When a process performs an action in relation to another process as object, these processes may be operating on the same operating system (OS) or on OSs different from each other. As an example for the latter case, it is conceivable that a process carries out communication with another process operating on a different OS, for example, by using a socket interface.

For example, an event is identified by information representing three elements, namely, subject, object, and action contents. For example, the information representing the subject (hereinafter referred to as subject information) is the information that identifies the process that caused the event. Hereinafter, the information that identifies a process will be referred to as process identification information. Process identification information indicates, for example, a name of a process. Further, for example, process identification information is the name or path of an executable file or the like.

The information representing an object (hereinafter referred to as object information) is, for example, the type and identification information of the object. The type of an object is, for example, process, file, other devices, or the like. When the object is a process, the object information includes the process identification information of the process.

When the object is a file, the object information includes information that identifies the file (hereinafter referred to as file identification information). File identification information is, for example, the name or path of the file. Further, when the object is a file, the object information may include a hash value of the file.

When the object is another apparatus, the object information includes, for example, identification information of the other apparatus (hereinafter referred to as apparatus identification information). Apparatus identification information is, for example, a network address such as an Internet Protocol (IP) address or a media access control (MAC) address. It should be noted that the other apparatus here may be not only a physical apparatus but may be a virtual apparatus (a virtual machine or the like). Further, when the object is another apparatus, the object information may indicate, in addition to or instead of the apparatus identification information, the number of objects (in other words, the number of other apparatuses with which the process as the subject of the event performed communication).

Information representing action contents (hereinafter referred to as contents information) is, for example, one of identifiers assigned in advance to various action contents. For example, identifiers different from each other are assigned to various contents of actions such as "to start a process", "to stop a process", "to open a file", "to read data from a file", "to write data in a file", "to open a socket", "to read data from a socket", "to write data in a socket", and the like. It should be noted that an access to a socket means an access to another apparatus associated with the socket.

FIG. 5 is a diagram illustrating information defining an event in tabular form. The table in FIG. 5 will be hereinafter referred to as the table 200. The table 200 includes subject information 202, object information 204, and contents information 206. The subject information 202 includes process names 208 and paths 210. The object information 204 includes types 212 and identification information 214.

<On First Event Information>

The first event information is information on an event that occurred in the standard apparatus 20. With respect to each event that occurred in the standard apparatus 20, the first event information indicates the above-described information (subject information, object information, and contents information) that identifies the event.

Here, a process causes an event in different ways depending on the execution environment, such as the type and version of the OS. Thus, it is preferable to provide first event information for each kind of execution environment in advance. Thus, a plurality of standard apparatuses 20 in different kinds of execution environment are provided and first event information is generated for each of the standard apparatuses 20 in advance. In such a case, first event information also includes information representing the execution environment (hereinafter referred to as execution environment information). Execution environment information indicates, for example, type of the OS, version number, build number, and the relevant CPU architecture.

The acquisition unit 2020 preferably acquires the first event information generated for a standard apparatus 20 in the same execution environment as the target apparatus to be determined 10 is in. It should be noted, however, that it is conceivable that there is no first event information generated for a standard apparatus 20 in the same execution environment as the target apparatus to be determined 10 is in. In such a case, the acquisition unit 2020 acquires, for example, the first event information generated for a standard apparatus 20 in the execution environment having the greatest degree of coincidence with the execution environment in which the target apparatus to be determined 10 is.

The degree of coincidence of execution environment is computed, for example, as a weighted average of respective degrees of coincidence of the pieces of information indicated by the execution environment information (type and version of the OS and the like as described above). The degree of coincidence of each element is, for example, scored as 1 when the corresponding pieces of information are the same and scored as 0 when they are not the same. As for the weight, heavier weights are allocated to more important elements in advance. For example, as the type of the OS is considered to be more important than the version of the OS, a heavier weight is allocated to the degree of coincidence of the type of the OS than to the degree of coincidence of the version of the OS.

<On Second Event Information>

The second event information is information on an event that occurred in the target apparatus to be determined 10. The form of the second event information may be the same as that of the first event information. Note, however, that the first event information and the second event information each need to identify an event but need not be in the same form.

<Acquisition of First Event Information: S102>

The acquisition unit 2020 acquires first event information (S102). The acquisition unit 2020 may acquire first event information in various ways. For example, the acquisition unit 2020 acquires first event information from a storage device that stores the first event information. This storage device may be provided outside the information processing apparatus 2000 (for example, in the standard apparatus 20) or inside the information processing apparatus 2000. Further, for example, the acquisition unit 2020 may receive first event information transmitted from another apparatus (for example, the standard apparatus 20).

<Acquisition of Second Event Information: S104>

The acquisition unit 2020 acquires second event information (S104). For example, the acquisition unit 2020 acquires second event information from a storage device that stores the second event information. This storage device may be provided outside the information processing apparatus 2000 (for example, the target apparatus to be determined 10) or inside the information processing apparatus 2000. Further, for example, the acquisition unit 2020 may receive second event information transmitted from another apparatus (for example, the target apparatus to be determined 10).

<Classification of Events: S106>

By using the first event information, the classification unit 2040 classifies the events indicated by the second event information as the first class or the second class (S106). Here, the first event information indicates information on the events that occurred in the standard apparatus 20. Thus, by comparing each event indicated by the second event information with the events indicated by the first event information, the classification unit 2040 determines whether the event indicated by the second event information is the same as any of the events that occurred in the standard apparatus 20. The classification unit 2040 classifies as the first class an event that is among the events indicated by the second event information and has been determined to be the same as one of the events that occurred in the standard apparatus 20. On the other hand, the classification unit 2040 classifies as the second class an event that is among the events indicated by the second event information and has been determined not to be the same as any of the events that occurred in the standard apparatus 20.

<<<On Comparing Events>>

The method of determining whether an event that occurred in the target apparatus to be determined 10 is the same as an event that occurred in the standard apparatus 20 will be described. As described above, an event can be identified with three elements, i.e., subject, object, and action contents. Thus, the classification unit 2040 compares an event that occurred in the target apparatus to be determined 10 with an event that occurred in the standard apparatus 20 with respect to these three elements and thereby determines whether the events are the same as each other. The classification unit 2040 determines that the events being compared are the same when these events are the same with respect to all of these three elements. In contrast, the classification unit 2040 determines that the events being compared are not the same when these events are not the same with respect to one or more of the elements.

<<<On the Sameness of Subjects>>>

The classification unit 2040 compares the subject information on the event indicated by the first event information with the subject information on the event indicated by the second event information. Here, as described above, the subject of an event is indicated by the process name, the name of an executable file, the path of an executable file, or the like of the process that caused the event. Whether these pieces of information are the same or not can be determined by, for example, using an algorithm for determining the similarity between character strings.

For example, when the respective pieces of subject information of these events are the same as each other, the classification unit 2040 determines that the subjects of these events are the same as each other. In contrast when the respective pieces of subject information of these events are not the same as each other, the classification unit 2040 determines that the subjects of these event are not the same as each other.

It should be noted, however, that the pieces of subject information for essentially the same events may differ from each other. For example, the target apparatus to be determined 10 and the standard apparatus 20 may have different paths for executable files having the same contents. More specifically, the path for the executable file "fileA.exe" may be "C:¥dir1¥fileA.exe" in the target apparatus to be determined 10 while it may be "D:¥dir2¥fileA.exe" in the standard apparatus 20. Thus, when the subject information indicates paths of executable files, for example, the classification unit 2040 may determine the sameness of the events by comparing only the file names included in the paths of the executable files.

<<<On the Sameness of Objects>>>

The classification unit 2040 compares the object information on the event indicated by the first event information with the object information on the event indicated by the second event information. When the respective pieces of object information of these events are the same as each other, the classification unit 2040 determines that the objects of these events are the same as each other. In contrast when the respective pieces of object information of these events are not the same as each other, the classification unit 2040 determines that the objects of these event are not the same as each other. It should be noted, however, that the classification unit 2040 may compare only the file names when the object information indicates paths of executable files as described above.

<<<On the Sameness of Action Contents>>>

The classification unit 2040 compares the contents information on the event indicated by the first event information with the contents information on the event indicated by the second event information. When the respective pieces of contents information of these events are the same as each other, the classification unit 2040 determines that the action contents of these events are the same as each other. In contrast, when the respective pieces of contents information of these events are not the same as each other, the classification unit 2040 determines that the action contents of these event are not the same as each other.

<Outline of the Models>

The first model and the second model will be described. For example, the first model includes (1) a score based on the number of occurrences or the frequency of occurrences of each event classified as the first class and (2) a first threshold value. Here a score is given to each event. The determination as to whether the target event to be determined is a target for warning is performed by comparing the score of the event with the first threshold value. When the score of the target event to be determined is not greater than the first threshold value, the first model determines that the event is a target for warning. In contrast, when the score of the target event to be determined is greater than the first threshold value, the first model determines that the event is not a target for warning.

Similarly, the second model includes (1) a score based on the number of occurrences or the frequency of occurrences of each event classified as the second class and (2) a second threshold value. Here again, a score is given to each event. The determination as to whether the target event to be determined is a target for warning is performed by comparing the score of the event with the second threshold value. When the score of the target event to be determined is not greater than the second threshold value, the second model determines that the event is a target for warning. In contrast, when the score of the target event to be determined is greater than the second threshold value, the second model determines that the event is not a target for warning.

It is assumed here that the score of an event is given according to the number of occurrences of the event. In this case, in the first model and in the second model, a greater score is to be given to an event when the number of occurrences of the event is greater. For example, the number of occurrences of the event itself is used as the score of the event. Further, for example, the number of occurrences of the event may be inputted to a discretionarily selected monotonically non-decreasing function and the output may be used as the score of the event. This function is stored in advance in a storage device accessible from the first learning unit 2060.

It is assumed, on the other hand, that the score of an event is given according to the frequency of occurrences of the event. In this case, in the first model and in the second model, a greater score is to be given to an event when the frequency of occurrences of the event is greater. For example, the frequency of occurrences of the event itself is used as the score of the event. Further, for example, the frequency of occurrences of the event may be inputted to a discretionarily selected monotonically non-decreasing function and the output may be used as the score of the event. This function is stored in advance in a storage device accessible from the first learning unit 2060.

By using the above-described models, an event with a small number of occurrences or an event with a low frequency of occurrences can be treated as a target for warning.

<Learning the First Model: S108>

The first learning unit 2060 performs learning of the first model (S108). Specifically, the first learning unit 2060 increases the score that the first model indicates for each event that is among the events indicated by the second event information and has been classified as the first class.

Here, assume that the number of occurrences of an event is used as the score of the event. In this case, for example, the first learning unit 2060 computes, for each event that is among the events indicated by the second event information and is classified as the first class, the score based on the number of occurrences of the event and performs learning of the first model to indicate the computed score. Here, the number of occurrences of each event is stored in a storage device.

Further, it is assumed that the frequency of occurrences of an event is used as the score of the event. In this case, for example, the first learning unit 2060 computes, for each event that is among the events indicated by the second event information and is classified as the first class, the frequency of the event. Using the score based on the frequency of occurrences computed for each event, the first learning unit 2060 then updates the score of the event.

It should be noted that the frequency of occurrences of an event may be the frequency of occurrences during the whole period since the start of operation of the target apparatus to be determined 10 or may be the frequency of occurrences during a part of the period. In the latter case, for example, the first learning unit 2060 computes, for each event that is among the events indicated by the second event information and is classified as the first class, the frequency of occurrences of the event by dividing the number of occurrences during the predetermined recent period by the length of the predetermined period. It should be noted that the number of occurrences of the event during the predetermined recent period can be identified by storing the date and time of the occurrence of each event in a storage device.

<Learning the Second Model: S110>

The second learning unit 2080 performs learning of the second model (S110). Specifically, the second learning unit 2080 increases the score in the second model for each event that is among the events indicated by the second event information and has been classified as the second class. It should be noted that the method of updating the score is the same as for the first model.

<Difference Between the First Model and the Second Model>

The first model and the second model are similar in that both of them are used for determining whether a target event to be determined is a target for warning. On the other hand, the first model is different from the second model in that the first model is used in a determination for the events classified as the first class while the second model is used in a determination for the events classified as the second class.

Here, as described above, an event of the first class is likely to be a normal event. Thus, an event of the first class is more likely to be an event that need not be treated as a target for warning, compared with an event of the second class. Thus, it is preferable to construct the first model and the second model in such a way that an event of the first class is less likely to be treated as a target for warning than an event of the second class. Two methods of constructing the models in such a way will be described below.

<<First Method>>

The first threshold value used as the criteria of determination in the first model is set at a smaller value than the second threshold value used as the criteria of determination in the second model. For example, assume that the first threshold value in the first model is Th1 and that the second threshold value in the second model is Th2. In this case, Th1 and Th2 are selected in such a way that Th1<Th2. In this way, an event having a score not greater than Th1 will be treated as a target for warning irrespective of whether the event is classified as the first class or the second class. On the other hand, an event having a score greater than Th1 and not greater than Th2 will not be treated as a target for warning when it is classified as the first class but will be treated as a target for warning when it is classified as the second class. It follows from this that an event of the first class is less likely to be treated as a target for warning than an event of the second class.

In this case, the first threshold value and the second threshold value may be set at any value under the condition that the first threshold value is smaller than the second threshold value. These threshold values are stored in advance in a storage device accessible from the information processing apparatus 2000.

<<Second Method>>

By introducing a difference between the degrees of learning in the first model and in the second model, it is ensured that an event of the first class is less likely to be treated as a target for warning than an event of the second class. Specifically, the score of an event of the first class in the learning of the first model is set to increase by a greater amount than the score of an event of the second class in the second model increases. For example, the scores are defined in the first model and the second model, respectively, as follows.

[Equation 1]

$$S_{1i} = f(n_i) = \alpha * n_i$$

$$S_{2j} = g(n_j) = \beta * n_j$$

$$s.t.\ \alpha > \beta \tag{1}$$

$S1i$ represents the score of an event i of the first class and ni represents the number of occurrences of the event i. $S2j$ represents the score of an event j of the second class and nj represents the number of occurrences of the event j. $\alpha$ and $\beta$ are positive real numbers. f(ni) is a function to convert the number of occurrence ni of the event i of the first class to the score $S1i$ and g(nj) is a function to convert the number of occurrence nj of the event j of the second class to the score $S2j$. Both of these are above-described monotonically non-decreasing functions.

In the equation (1) above, the score of an event of the first class is a value computed by multiplying the number of occurrences of the event by $\alpha$. Thus, the score of an event of the first class increases by $\alpha$ when the number of occurrences increases by 1. On the other hand, the score of an event of the second class is a value computed by multiplying the number of occurrences of the event by $\beta$. Thus, the score of an event of the second class increases by $\beta$ when the number of occurrences increases by 1. As $\alpha > \beta$, the score of an event of the first class increases by a greater amount than the score of an event of the second class increases.

It should be noted that the scores computed based on the frequency of occurrences can be defined by replacing the number of occurrences with the frequency of occurrences in the equation (1).

Here, in a case in which a difference between the degrees of learning in the first model and in the second model is introduced in this way, the first threshold value and the second threshold value may be the same value. Note, however, that, in this case also, the first threshold value may be set at a value smaller than the second threshold value.

<On Generating the Models>

The first model and the second model may be generated in advance and stored in a storage device or may be generated by the information processing apparatus 2000. In the latter case, for example, the first learning unit 2060 generates the first model when the first model has not been generated (when the first model has not been stored in a storage device) at the time of the execution of the learning of the first model. Similarly, for example, the second learning unit 2080 generates the second model when the second model has not been generated (when the second model has not been stored in a storage device) at the time of the execution of the learning of the second model.

Example Embodiment 2

A functional configuration of information processing apparatus 2000 according to Example Embodiment 2 is illustrated in FIG. 2, similarly to the information processing apparatus 2000 according to Example Embodiment 1. Except for the matters described below, the information processing apparatus 2000 according to Example Embodiment 2 has the same functions as the information processing apparatus 2000 according to Example Embodiment 1.

According to the present example embodiment, the first model is generated in advance based on events that occurred in the standard apparatus 20. The first learning unit 2060 performs learning of this first model. To do so, the acquisition unit 2020 according to Example Embodiment 2 acquires the first model. Then the first learning unit 2060 according to the Example Embodiment 2 performs learning of the acquired first model.

It should be noted that the first model is generated based on events that occurred in the standard apparatus 20 by the same method as the method by which the first learning unit 2060 generates the first model in the Example Embodiment 1. For example, the first model is generated by using the above-described equation (1).

It should be noted that the first model may be generated in the information processing apparatus 2000 or may be generated in an apparatus other than the information processing apparatus 2000. When the information processing apparatus 2000 generates the first model, the information processing apparatus 2000 acquires information that represent events that occurred in the standard apparatus 20, like the table 200 illustrated in FIG. 5, and generates the first model using that information.

Advantageous Effects

According to the information processing apparatus 2000 according to the present example embodiment, the operation of the information processing apparatus 2000 is started after the first model has been learned to some extent by using the events that occurred in the standard apparatus 20. Thus, it is possible to make accurate determination with respect to the events of the first class at an early stage, compared with the case in which the first model has not been learned in advance. Further, since the information on the events that occurred in the standard apparatus 20 can be used not only for classifying the events that occurred in the target apparatus to be determined 10 but also for learning the first model, the standard apparatus 20 is utilized more effectively.

<Example of a Hardware Configuration>

A hardware configuration of a computer for realizing the information processing apparatus 2000 according to Example Embodiment 2 can be illustrated by, for example, FIG. 3, similarly to Example Embodiment 1. Note, however, the storage device 1080 of the computer 1000 for realizing the information processing apparatus 2000 according to the present example embodiment further stores program modules for realizing the functions of the information processing apparatus 2000 according to the present example embodiment.

Example Embodiment 3

Figure 6:
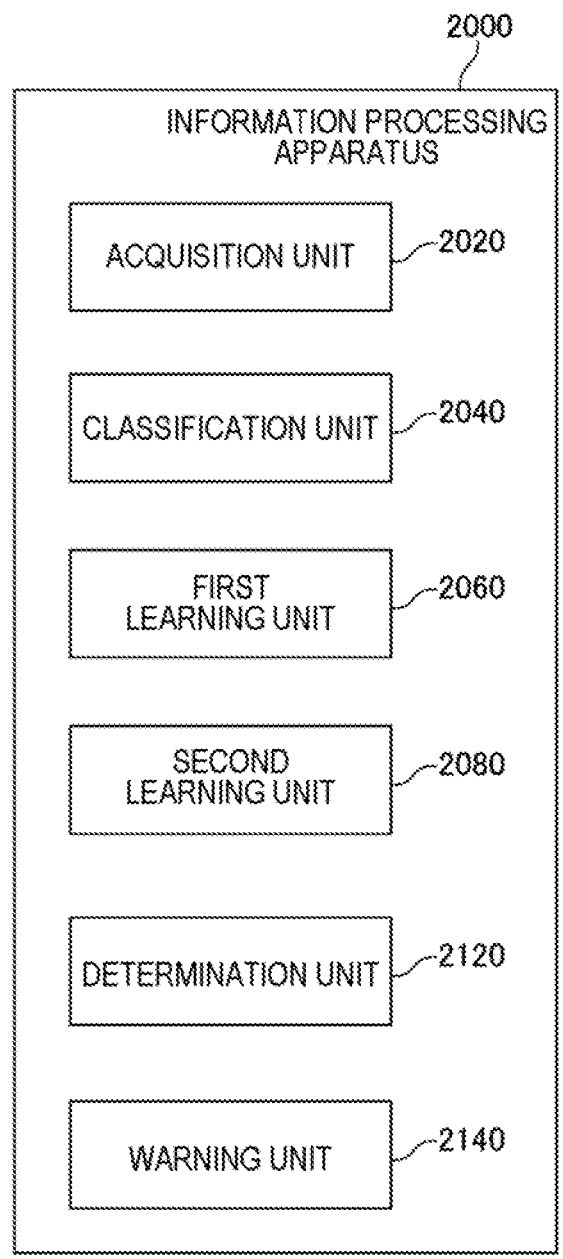
FIG. 6 is a block diagram illustrating a functional configuration of an information processing apparatus according to Example Embodiment 3.

FIG. 6 is a block diagram illustrating a functional configuration of the information processing apparatus 2000 according to Example Embodiment 3. Except for the matters described below, the information processing apparatus 2000 according to Example Embodiment 3 has the same functions as the information processing apparatus 2000 according to Example Embodiment 1 or 2.

The information processing apparatus 2000 according to Example Embodiment 3 acquires information on a target event to be determined and determines whether the target event to be determined is a target for warning. When the target event to be determined is a target for warning, the information processing apparatus 2000 according to Example Embodiment 3 outputs a predetermined piece of warning information.

To do so, the information processing apparatus 2000 according to Example Embodiment 3 includes a determination unit 2120 and a warning unit 2140. Further, the acquisition unit 2020 according to the Example Embodiment 3 acquires information on the target event to be determined. The classification unit 2040 determines whether the target event to be determined should be classified as the first class or the second class, using the first event information. Specifically, when the target event to be determined is the same as an event that occurred in the standard apparatus 20, the target event to be determined is classified as the first class and, when the target event to be determined is not the same as any event that occurred in the standard apparatus 20, the target event to be determined is classified as the second class.

When the target event to be determined is classified as the first class, the determination unit 2120 determines by using the first model whether the target event to be determined is a target event for warning. Further, when the target event to be determined is classified as the second class, the determination unit 2120 determines by using the second model whether the target event to be determined is a target event for warning. It should be noted that the method of determining by using the first model whether the event of the first class is a target for warning and the method of determining by using the second model whether the event of the second class is a target for warning are as described with respect to the Example Embodiment 1.

The warning unit 2140 outputs a predetermined piece of warning information when it has been determined that the target event to be determined is a target event for warning.

Advantageous Effects

The information processing apparatus 2000 according to the present example embodiment performs classification as to whether the target event to be determined is an event that occurred also in the standard apparatus 20 or otherwise and determines whether the target event to be determined is a target for warning by using a model according to the classification. Thus, it is possible to make accurate determination whether to determine the target event to be determined as a target for warning, compared with a case in which such classification is not taken into account. Further, as warning information is outputted when it is determined that the target event to be determined is a target for warning, the administrator or the like of the target apparatus to be determined 10 can recognize that there can be an anomaly in the target apparatus to be determined 10.

<Example of a Hardware Configuration>

A hardware configuration of a computer for realizing the information processing apparatus 2000 according to Example Embodiment 3 can be illustrated by FIG. 3, similarly to Example Embodiment 1. It should be noted, however, that the storage device 1080 of the computer 1000 for realizing the information processing apparatus 2000 according to the present example embodiment further stores program modules for realizing the functions of the information processing apparatus 2000 according to the present example embodiment.

<Flow of Processing>

Figure 7:
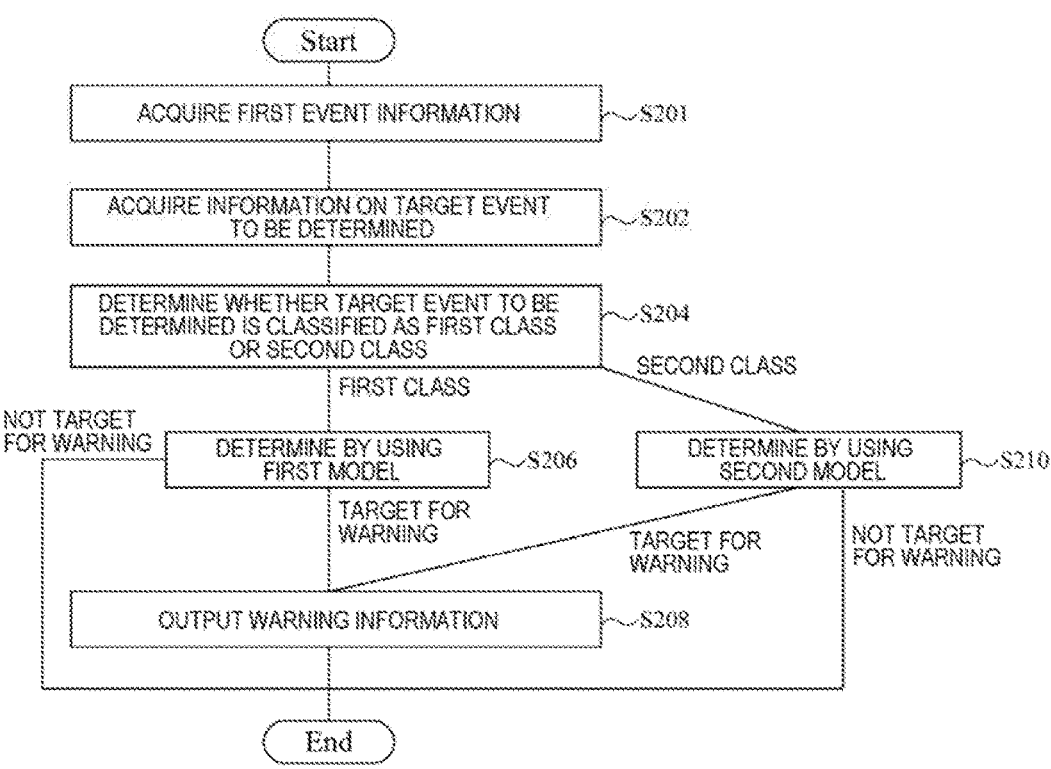
FIG. 7 is a flow chart illustrating a flow of processing executed by an information processing apparatus according to Example Embodiment 3.

FIG. 7 is a flow chart illustrating a flow of processing executed by the information processing apparatus 2000 according to Example Embodiment 3. The acquisition unit 2020 acquires the first event information (S201). The acquisition unit 2020 acquires information on the target event to be determined (S202). The classification unit 2040 determines whether the target event to be determined is classified as the first class or the second class (S204). When the target event to be determined is classified as the first class (S204: FIRST CLASS), the determination unit 2120 determines by using the first model whether the target event to be determined is a target for warning (S206). When the target event to be determined is a target for warning (S206: TARGET FOR WARNING), the warning unit 2140 outputs warning information (S208). When the target event to be determined is not a target for warning (S206: NOT TARGET FOR WARNING), the processing of FIG. 7 ends.

When the target event to be determined is classified as the second class (S204: SECOND CLASS), the determination unit 2120 determines by using the second model whether the target event to be determined is a target for warning (S210). When the target event to be determined is a target for warning (S210: YES), the warning unit 2140 outputs warning information (S208). When the target event to be determined is not a target for warning (S210: NO), the processing of FIG. 7 ends.

<On Warning>

The warning information outputted by the warning unit 2140 may be various pieces of information. For example, the warning information may be a character string, image, or sound that notifies the occurrence of a target event for warning. It should be noted that it is preferable that the warning information contains information for identifying the target event to be determined that has been determined to be a target for warning (subject information, object information, and contents information).

The warning information may be outputted to various output destinations. For example, the warning information is outputted to a computer used by the administrator or the like of the target apparatus to be determined 10. This computer may be a stationary computer (a desktop PC or the like) or may be a portable computer (a mobile terminal or the like). Further, the warning information may be transmitted to administrator or the like of the target apparatus to be determined 10. In this case, the warning information is transmitted to the administrator or the like of the target apparatus to be determined 10 by, for example, e-mail or the like.

Further, for example, warning information may be stored in a storage device accessible from the computer used by the administrator or the like of the target apparatus to be determined 10. More specifically, this storage device is provided with a log file in which information on a target event for warning is stored when such an event occurs. When a target event to be determined has been determined to be a target for warning, the warning unit 2140 adds information on the target event to be determined to this log file. By referring to this log file, the computer used by the administrator or the like of the target apparatus to be determined 10 can acquire the information on the target event for warning that occurred in the target apparatus to be determined 10.

<On the Target Event to be Determined>

The target events to be determined may be the same as or different from the events used for the learning of the models. In the former case, with respect to an event indicated by the second event information, the information processing apparatus 2000 not only determines whether the event is a target for warning but also performs learning of the models by using the event. Thus, at an early stage of learning of the models about the target apparatus to be determined 10, many events indicated by the second event information can be determined to be targets for warning. However, in the course of continued operation of the target apparatus to be determined 10, the learning of the models progresses and the events that often occur in the target apparatus to be determined 10 will be less likely to be determined as a target for warning. On the other hand, the events that rarely occur in the target apparatus to be determined 10 continue to be determined as targets for warning. As described above, by using the target events to be determined also for the learning of the models, it is possible to develop the models into maturity while operating the target apparatus to be determined 10.

It should be noted that, when the target events to be determined are used for the learning of the models, the determination by the determination unit 2120 may be performed first or the learning of the models may be performed first.

Here, when the target events to be determined are also used for the learning of the models, many events can be determined as a target for warning at the early stage after the start of the operation of the target apparatus to be determined 10, as described above. Thus, an arrangement may be made so as not to output warning information until a predetermined condition, such as the expiry of a predetermined period after the start of the operation of the target apparatus to be determined 10, is satisfied. One of the methods for preventing the output of warning information by the information processing apparatus 2000 is to prevent the warning unit 2140 from operating until the above-described predetermined condition is satisfied. Another method is to configure the warning unit 2140 in such a way as "to output warning information only when the target event to be determined has been determined as a target for warning and the above-described predetermined condition is satisfied".

Further, the method of outputting warning information may be changed depending on whether the above-described predetermined condition is satisfied. For example, when the predetermined condition is satisfied, warning information is outputted in a form that the administrator or the like of the target apparatus to be determined 10 can recognize promptly. For example, when the target event to be determined has been determined as a target for warning, the warning unit 2140 transmits warning information to a terminal used by the administrator or the like of the target apparatus to be determined 10 when the predetermined condition is satisfied while the warning unit 2140 outputs warning information to a log file when the predetermined condition is not satisfied.

By doing this, in a situation in which the models have not been developed into maturity and warning information is outputted often, the nuisance for the administrator or the like of the target apparatus to be determined 10 can be reduced while continuing to provide the administrator or the like with warning information. Further, outputting warning information in a form that the administrator or the like of the target apparatus to be determined 10 can recognize promptly generally requires more computer resource. Thus, in a situation where warning information is outputted often because the models have not been developed into maturity, there is also an advantageous effect of reducing the computer resource consumed.

The above-described predetermined condition may be other than the condition that a predetermined period expires after the start of the operation of the target apparatus to be determined 10. The condition may be, for example, that the number of events that have been used for learning is not smaller than a predetermined number.

Example embodiments of the present invention have been described above with reference to the drawings. These are examples of the present invention and it is possible to adopt a combination of the above-described example embodiments or various configurations other than those described above.

The invention claimed is:

1. An information processing apparatus comprising:
at least one memory configured to store instructions; and
at least one processor configured to execute the instructions to perform operations, the operations comprising:
acquiring first event information, which indicates information on an event caused by a process in a standard apparatus, and second event information, which indicates information on an event caused by a process in a target apparatus to be determined;
classifying, by using the first event information, each event being indicated by the second event information, either as an event of a first class, which is an event that occurs also in the standard apparatus, or as an event of a second class, which is an event that does not occur in the standard apparatus;
performing learning of a first model for determining whether an event classified as the first class is a target event for warning, by using the second event information on an event classified as the first class; and
performing learning of a second model for determining whether an event classified as the second class is a target event for warning, by using the second event information on an event classified as the second class.

2. The information processing apparatus according to claim 1, wherein a target event for warning is an event in which malware is involved.

3. The information processing apparatus according to claim 1, wherein
the first model
indicates, for each event classified as the first class, a score based on a number of occurrences or a frequency of occurrences of the event, and
determines that a target event to be determined is a target for warning when the score of the event is equal to or greater than a first threshold value,
the second model
indicates, for each event classified as the second class, a score based on a number of occurrences or a frequency of occurrences of the event, and
determines that a target event to be determined is a target for warning when the score of the event is equal to or greater than a second threshold value,
the operations further comprise
performing learning of the first model by increasing in the first model the score of an event being classified as the first class among events indicated by the second event information, and
performing learning of the second model by increasing in the second model the score of an event being classified as the second class among events indicated by the second event information.

4. The information processing apparatus according to claim 3, wherein the first threshold value is greater than the second threshold value.

5. The information processing apparatus according to claim 3, wherein an amount of a score that the first learning unit increases is greater than an amount of a score that the second learning unit increases.

6. The information processing apparatus according to claim 1, wherein the operations further comprise acquiring the first model, which is generated based on each of events that occurs in the standard apparatus, and, based on the second event information, performing learning of the acquired first model.

7. The information processing apparatus according to claim 1,
wherein the operations further comprise:
acquiring information on a target event to be determined;
determining whether the target event to be determined is classified as the first class or the second class;
determining whether the target event to be determined is a target event for warning by using the first model when the target event to be determined is classified as the first class, and determining whether the target event to be determined is a target event for warning by using the second model when the target event to be determined is classified as the second class; and
outputting a predetermined piece of warning information when it is determined that the target event to be determined is a target event for warning.

8. The information processing apparatus according to claim 7, wherein the target event to be determined is an event indicated by the second event information.

9. A control method executed by a computer, the method comprising:
acquiring first event information, which indicates information on an event caused by a process in a standard apparatus, and second event information, which indicates information on an event caused by a process in a target apparatus to be determined;
classifying, by using the first event information, each event being indicated by the second event information, either as an event of a first class, which is an event that occurs also in the standard apparatus, or as an event of a second class, which is an event that does not occur in the standard apparatus;
performing a first learning of a first model for determining whether an event classified as the first class is a target event for warning, by using the second event information on an event classified as the first class; and performing a second learning of a second model for determining whether an event classified as the second class is a target event for warning, by using the second event information on an event classified as the second class.

10. The control method according to claim 9, wherein a target event for warning is an event in which malware is involved.

11. The control method according to claim 9, wherein the first model indicates, for each event classified as the first class, a score based on a number of occurrences or a frequency of occurrences of the event, and determines that a target event to be determined is a target for warning when the score of the event is equal to or greater than a first threshold value, the second model indicates, for each event classified as the second class, a score based on a number of occurrences or a frequency of occurrences of the event, and determines that a target event to be determined is a target for warning when the score of the event is equal to or greater than a second threshold value, at the first learning, learning of the first model is performed by increasing in the first model the score of an event being classified as the first class among events indicated by the second event information, and at the second learning, learning of the second model is performed by increasing in the second model the score of an event being classified as the second class among events indicated by the second event information.

12. The control method according to claim 11, wherein the first threshold value is greater than the second threshold value.

13. The control method according to claim 11, wherein an amount of a score being increased at the first learning is greater than an amount of a score being increased at the second learning.

14. The control method according to claim 9, wherein the first event information is the first model, which is generated based on each of events that occurred in the standard apparatus, and, at the first learning, learning of the first model acquired as the first event information is performed, based on the second event information.

15. The control method according to claim 9, wherein at the acquisition, information on a target event to be determined is acquired, and at the classification, it is determined whether the target event to be determined is classified as the first class or the second class, the method further comprising:

determining whether the target event to be determined is a target event for warning by using the first model when the target event to be determined is classified as the first class and determining whether the target event to be determined is a target event for warning by using the second model when the target event to be determined is classified as the second class; and outputting a predetermined piece of warning information when it is determined that the target event to be determined is a target event for warning.

16. The control method according to claim 15, wherein the target event to be determined is an event indicated by the second event information.

17. A non-transitory computer readable medium storing a program that causes a computer to execute each of the steps of a control method, the method comprising:

acquiring first event information, which indicates information on an event caused by a process in a standard apparatus, and second event information, which indicates information on an event caused by a process in a target apparatus to be determined;

classifying, by using the first event information, each event being indicated by the second event information, either as an event of a first class, which is an event that occurs also in the standard apparatus, or as an event of a second class, which is an event that does not occur in the standard apparatus;

performing learning of a first model for determining whether an event classified as the first class is a target event for warning, by using the second event information on an event classified as the first class; and performing learning of a second model for determining whether an event classified as the second class is a target event for warning, by using the second event information on an event classified as the second class.

* * * * *